United States Patent

Shaheen et al.

[15] 3,668,776

[45] June 13, 1972

[54] METHOD OF MAKING INTERSTITIAL CONDUCTORS BETWEEN PLATED MEMORY WIRES

[72] Inventors: Joseph M. Shaheen, La Habra; John Simone, Garden Grove, both of Calif.

[73] Assignee: North American Rockwell Corporation

[22] Filed: June 12, 1970

[21] Appl. No.: 45,738

[52] U.S. Cl. ...........................29/604, 29/625, 340/174 PW, 340/174 VA, 340/174 S

[51] Int. Cl. ...........................H01f 7/06

[58] Field of Search.............29/604, 624, 625; 340/174 PW, 340/174 VA, 174 S

[56] References Cited

UNITED STATES PATENTS

| | | | |
|---|---|---|---|
| 3,449,731 | 6/1969 | Chow | 340/174 PW |
| 3,371,326 | 2/1968 | Fedde | 340/174 PW |
| 3,553,648 | 1/1971 | Gorman et al. | 340/174 PW |

*Primary Examiner*—John F. Campbell
*Assistant Examiner*—Carl E. Hall
*Attorney*—L. Lee Humphries, H. Frederick Hamann and Robert G. Rogers

[57] ABSTRACT

Channels are etched in a relatively thick conducting metal layer of a double metal clad dielectric board. The channels are coated with an insulating film. The uncovered dielectric surface of a single metal clad dielectric board is placed over the coated channels to form tunnels for plated memory wires. The exposed conducting layers of the boards are etched into strips orthogonal to the tunnels to form word straps for the plated memory. The conducting metal layers comprising the interstitial conductors between the tunnels are interconnected at a common point.

4 Claims, 5 Drawing Figures

INVENTORS
JOSEPH M. SHAHEEN
JOHN SIMONE
BY
Robert G. Rogers
ATTORNEY

INVENTORS
JOSEPH M. SHAHEEN
JOHN SIMONE
BY Robert G. Rogers
ATTORNEY

METHOD OF MAKING INTERSTITIAL CONDUCTORS BETWEEN PLATED MEMORY WIRES

BACKGROUND OF THE INVENTION

1. Field of the Invention

The invention relates to interstitial conductors between tunnels of a plated wire memory mat and more particularly to interstitial conductors comprising insulatively coated conducting metal layers forming the sides of the channels.

2. Description of Prior Art

U.S. Pat. No. 3,501,830, issued Mar. 24, 1970 to T. F. Bryzinski et al., for Methods of Making a Filamentary Magnetic Memory Using Flexible Sheet Metal teaches and shows a process for forming channels for accommodating plated memory wires called filaments. In one process, polystyrene is molded into layers for forming a channel structure. Copper clad flexible sheets are formed on the both sides of the polystyrene layers to complete the plated wire memory structure. Filaments are inserted into the channels before the tunnel structure is formed. The filaments are replaced by magnetically coated filaments subsequently. The patent also shows how electrical connections are made to the plated memory wires.

It is pointed out, however that the patent does not teach or show interstitial conductors between each of the plated memory wires. The process also requires that removable wires (filaments) be inserted into the tunnel structure as the tunnel structure is being formed. A process is preferred in which the tunnels can be formed without the necessity for using removable wires as taught by the patent.

Interstitial conductors are necessary to reduce the electrical field between plated memory wires during the operation of the structure as a plated wire memory. If the electrical interference between wires can be reduced, the plate memory wires can be placed closer together for increasing the density of the plated wire memory.

The present invention is a process for producing a plated wire memory tunnel structure without the necessity for removing wires and for forming interstitial conductors between plated wire memory tunnels. The invention also contemplates the structure which results from the process.

SUMMARY OF THE INVENTION

Briefly, the invention comprises the resulting product and a process for forming interstitial conductors separated by tunnels for plated memory wires by initially forming channels in a relatively thick conducting metal layer of a double metal clad dielectric board. The conducting metal layers between the channels are coated with an insulating film to prevent electrical contact between the metal layers and plated memory wires. The dielectric surface of a single metal clad dielectric board is placed over the channels to form tunnels for plated memory wires. Word straps, orthogonal to the tunnels, for the plated wire memory are formed on the outside surface of both boards. The conducting metal layers, comprising the interstitials between the tunnels are connected at a common point. Plated memory wires are inserted into the tunnels.

The plated memory wires and the word straps are inserted into an electrical connector for providing power, electrical ground connections, input and output signals. The common connection of the interstitial conductors are connected to electrical ground.

Therefore, it is an object of this invention to provide a process for producing a plated memory mat in which interstitial conductors are formed between tunnels for plated memory wires.

It is another object of this invention to provide a plated memory mat having interstitial conductors formed between tunnels for plated memory wires.

It is another object of this invention to provide a process and a product for reducing an electrical field interference between adjacent plated memory wires.

It is still another object of this invention to provide an improved process and product for increasing the bit density of a plated wire memory.

It is still a further object of this invention to provide interstitial conductors between tunnels of a plated wire memory comprising relatively thick conducting metal layers.

It is still another object of this invention to provide a process for producing interstitial conductors between tunnels of a plated wire memory by forming channels in a relatively thick conducting metal layer.

These and other objects of the invention will become more apparent when taken in connection with the following description of the invention which includes a brief description of the drawings and a description of the preferred embodiments.

DESCRIPTION OF PREFERRED EMBODIMENT

Figure 1:
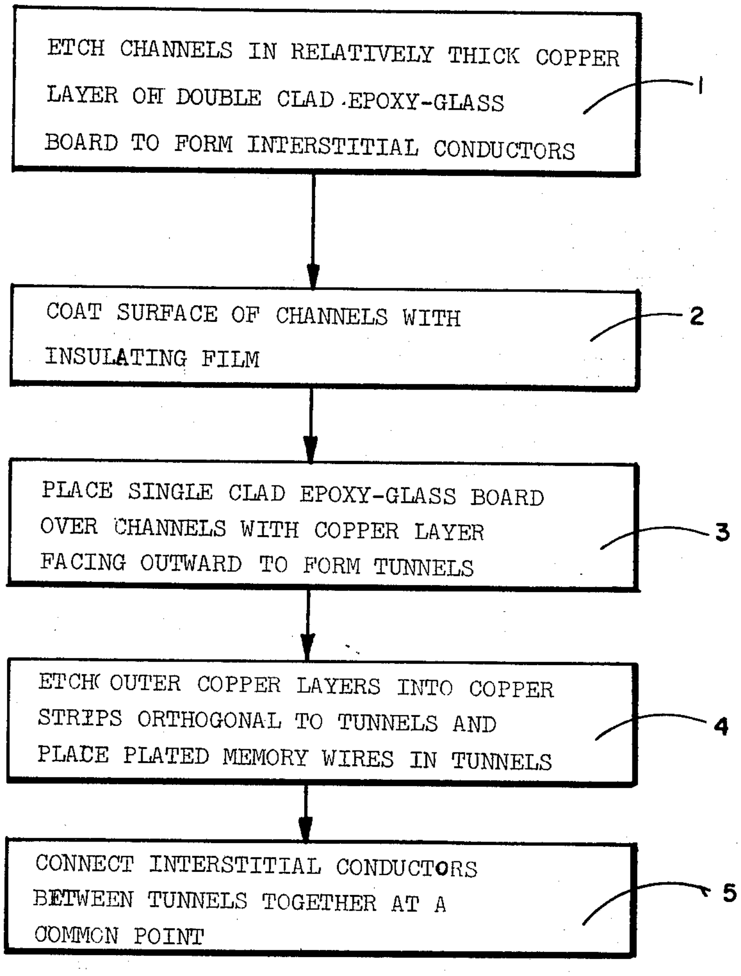
FIG. 1 is a block diagram of the steps for producing the interstitial conductors between tunnels of a plated wire memory.
Figure 4:
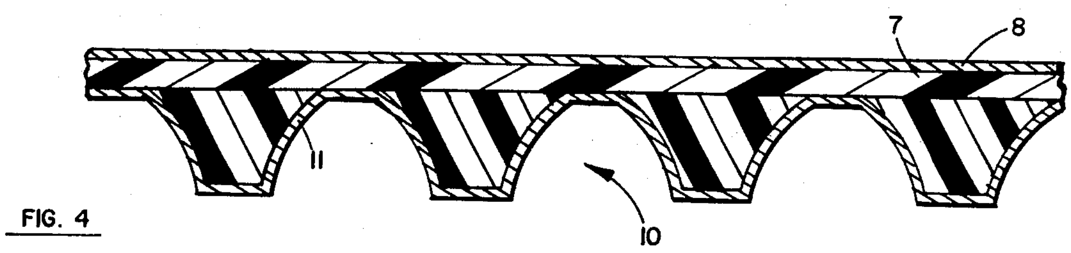
FIG. 4 is a cross-sectional view of the FIG. 3 board showing an insulating film over the surface areas of the etched channels.
Figure 5:
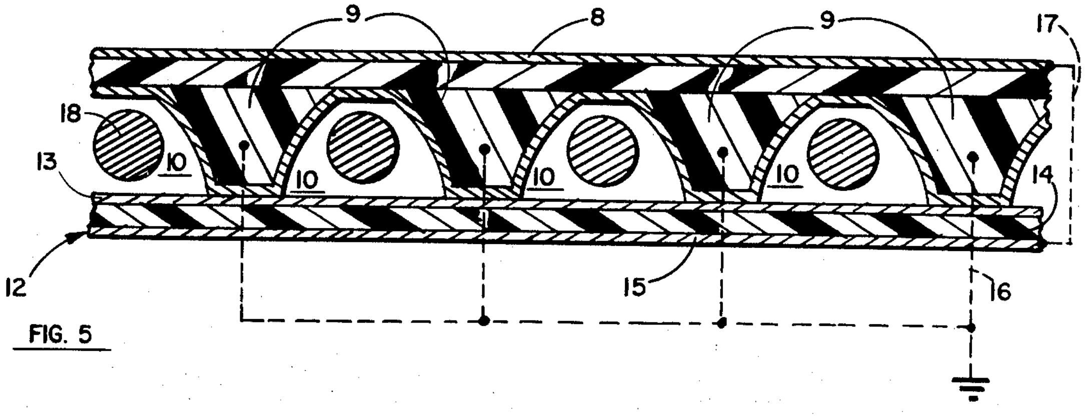
FIG. 5 is a cross-sectional view of the FIG. 4 board on which a single metal clad dielectric board has been placed to form tunnels for plated memory wires.

FIG. 1 is a block diagram of the steps required to produce the plated wire memory mat shown in FIG. 5. Step 1 of FIG. 1 can best be understood by referring to FIG. 2 and 3. Step 2 can best be understood by referring to FIG. 4. Steps 3, 4 and 5 are described in connection with FIG. 5.

In Step 1, channels are etched in a relatively thick copper layer of a double copper clad epoxy-glass board to form interstitial conductors. The unetched portions form the interstitials. The channels may be etched by photo resist techniques and etchants well known to persons skilled in the art. For example, the copper can be etched by a ferric chloride solution.

Figure 2:
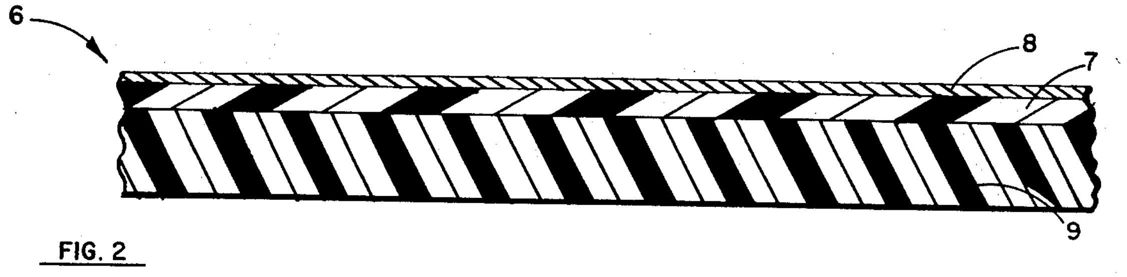
FIG. 2 is a cross-sectional view of a double metal clad dielectric board having a relatively thick metal layer on one surface of the dielectric substrate.

FIG. 2 is a cross sectional view of double metal clad dielectric board 6 comprising epoxy-glass layer 7, relatively thin copper layer 8, and a relatively thick copper layer 9. The relatively thick copper layer 9 may be 5-ounce copper while the thin layer 8 may be ½-ounce copper. The epoxy-glass layer may have a thickness of 0.0025 inches.

Photo resist is applied to the outer surface of the copper layer 9. Parallel strips of the photo resist are developed for exposing 0.003 inch openings in the copper layer 9. The copper exposed by the openings is etched, as indicated above, for forming copper layers on a dielectric substrate as shown in FIG. 3.

Figure 3:
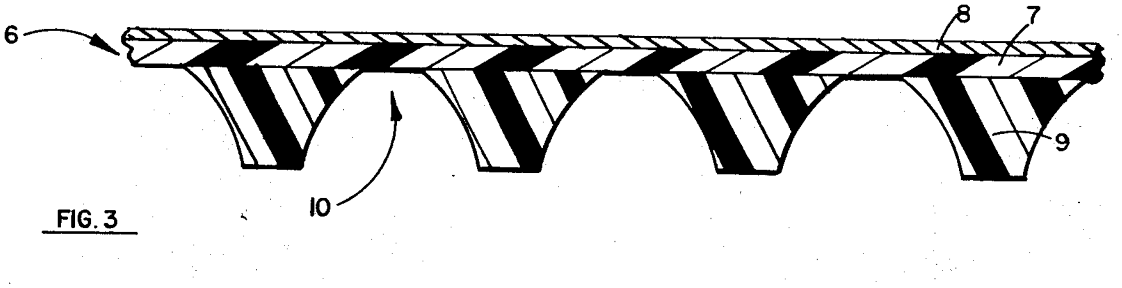
FIG. 3 is a cross-sectional view of the FIG. 2 board showing channels etched in the relatively thick metal layer.

FIG. 3 is a cross-sectional view of the FIG. 2 board showing channels 10 etched in the copper layer 9. The etching process continues until the inside surface of the epoxy-glass layer 7 is exposed. The curved shape of the channels 10 is due to the time required to etch through the copper layer 9. The photo resist layer has been removed from the FIG. 3 view.

In Step 2, the side walls of the interstitial conductors (and the channels) as well as the exposed surface area of the epoxy-glass layer, are coated with an insulating film such as epoxy resin. In one example, the insulating coating may be applied by a fluidized technique. In another technique, the insulating coating may be applied by a dipping technique.

FIG. 4 is a cross-sectional view of the board 6 after the insulating film 11 has been applied to cover the side walls of the interstitials (and channels 10). In addition to applying a thin insulating coating of epoxy resin to the etched channels in copper layer 9, an additional single metal clad dielectric board is also coated with an adhesive such as an epoxy resin film.

In Step 3, a single copper clad epoxy-glass board is placed over the channels and interstitial conductors etched in the copper layer. The epoxy-glass board closes the tops of the channels to form tunnels for plated memory wires. The thin epoxy film on the tops of the interstitials acts as an adhesive for joining the single copper clad board to the top of the etched interstitials. Heat and pressure are applied to fuse the structures together. For example, a pressure of 100 psi at a temperature of 350° F. fuse the structures together.

FIG. 5 is an illustration of a single metal clad dielectric board 12 placed over the channels 10 to form tunnels for accommodating plated memory wires. Thin adhesive film 13 and the film 11 on the tops of the interstitial conductors etched in copper layer 9 connect the epoxy-glass layer 14 of board 12 to the tops of the interstitials.

The combination shown in FIG. 5 is subjected to heat and pressure so that the boards 6 and 12 fuse together. The structure is placed in an oven or press for achieving fusion. The FIG. 5 structure also illustrates copper layer 8 and copper layer 15 on the outer surfaces of boards 6 and 12, respectively.

In Step 4, the outer copper layers of the double and single copper clad epoxy-glass boards are etched into parallel copper strips which are orthogonal to the tunnels. The etched copper strips are used as word straps for the plated wire memory. The word straps are electrically connected at one edge of the structure to provide electrical continuity around the plated memory wires in the tunnels. The connection of the word straps is illustrated by dotted line 17. Plated through holes can be used to electrically interconnect the word straps.

An example of etched word straps can be seen by referring to copending application entitled "Conductors Between Plated Memory Wires" filed on or about June 5, 1970, by Joseph M. Shaheen et al. The patent application shows how copper layers are etched into strips for forming word straps. It also illustrates how the word straps are electrically connected to provide electrical continuity around the plated memory wires.

In addition, plated memory wires 18 are inserted in the tunnels. Ordinarily, the plated memory wires are inserted as the last step of the process to avoid possible breakage and contamination which could occur during other process steps. However, for purposes of describing one embodiment, the plated memory wires 18 are inserted in Step 4. Plated memory wires comprising an outer coating of nickel-iron alloy and an inner core of beryllium copper represent one example of plated memory wires.

In Step 5, the interstitial conductors forming the side walls of the channels 10 are interconnected at a common point illustrated by dotted line 16. During the operation of the plated wire memory, the common point is connected to electrical ground. In certain embodiments, one or more common points may be used depending on the requirements of a particular application.

The interstitial conductors may be connected together by depositing a conducting metal layer along one edge of either epoxy-glass layer 7 or epoxy-glass layer 14. Standard masking and plating techniques may be used to deposit the copper layer between the interstitial conductors between the plated wire memory tunnels.

Although the embodiment has been described by using copper layers on epoxy-glass substrates, it should be obvious that other metal clad dielectric boards can also be used. For example, nickel layers on a polyimide substrate can be used. In addition, adhesives other than epoxy adhesives may be used in fusing the structures together to form the FIG. 5 embodiment.

In operation, information is written into a selected memory bit location along a plated memory wire by passing a current down a selected word strap in coincidence with a bit current being passed down a plated memory wire. The polarity of the bit current determines whether a logic "1" and/or a logic "0" is written at the intersection of the word strap and the plated wire. The interstitials prevent the electrical field in one plated wire from causing information to be written into the adjacent bit portions on either side of the selected plated wire.

It would be possible to avoid the interference between plated memory wires by extending the distance between the wires. However, it is preferred to have an increased storage capacity without increasing the size of the plated wire memory. The relatively increased capacity without the necessity for increasing the size of the plated wire memory mat.

We claim:

1. In a process for forming a plated wire memory having parallel-spaced metallic conductors between tunnels located therein for insertion within said tunnels of plated memory wires, wherein the starting point of the process consists of producing a first sheet of material consisting of an insulating layer sandwiched between first and second metallic layers, comprising the steps of:

etching a plurality of parallel-spaced channels in the first metallic layer which extend from the unattached major surface of the first metallic layer through said first metallic layer to the insulating layer thereby forming a plurality of parallel-spaced metallic conductors on the insulating layer;

forming an insulating film that covers the exposed surfaces of the parallel-spaced metallic conductors; and adhesively attaching a metallically clad sheet, comprising a dielectric material and a metallic material, to the insulating film wherein the dielectric material is in contact with those portions of the insulating film covering the surfaces of the metallic conductors that are opposite to the metallic conductor surfaces attached to the insulating layer, thereby transforming said channels into said tunnels.

2. The invention as stated in claim 1, including the further step of:

forming conducting metal strips from said metallic material and from said second metal layer on the outer surfaces of the insulating layer and the dielectric material, said conducting metal strips being substantially orthogonal to said tunnels for providing word straps for said plated wire memory.

3. The invention as stated in claim 1, wherein:

a plurality of said strips are preselected for electrically connecting them in a manner so as to provide electrical paths in directions substantially perpendicular to the directions of the tunnels.

4. The invention as stated in clam 3, including:

inserting a plated memory wire in each of said tunnels; and interconnecting at least some of the parallel-spaced metallic conductors.

* * * * *